(12) United States Patent
Goldberg

(10) Patent No.: US 9,731,659 B2
(45) Date of Patent: Aug. 15, 2017

(54) VEHICLE ROOFTOP CARGO HOLDER

(71) Applicant: James Jordan Goldberg, Carmel, CA (US)

(72) Inventor: James Jordan Goldberg, Carmel, CA (US)

( * ) Notice: Subject to any disclaimer, the term of this patent is extended or adjusted under 35 U.S.C. 154(b) by 42 days.

(21) Appl. No.: 14/604,373

(22) Filed: Jan. 23, 2015

(65) Prior Publication Data

US 2016/0214543 A1    Jul. 28, 2016

(51) Int. Cl.
| | |
|---|---|
| *B60R 9/058* | (2006.01) |
| *B60R 9/048* | (2006.01) |
| *B60R 9/08* | (2006.01) |
| *B60R 9/045* | (2006.01) |
| *B60R 9/055* | (2006.01) |

(52) U.S. Cl.
CPC ............... *B60R 9/08* (2013.01); *B60R 9/045* (2013.01); *B60R 9/055* (2013.01)

(58) Field of Classification Search
CPC ............ B60R 9/08; B60R 9/058; B60R 9/048
See application file for complete search history.

(56) References Cited

U.S. PATENT DOCUMENTS

| | | | | |
|---|---|---|---|---|
| 3,581,962 A * | 6/1971 | Osborn | ...................... | B60R 9/10 211/22 |
| 3,685,061 A * | 8/1972 | Wray | ........................ | B60P 3/38 135/117 |
| 4,911,348 A * | 3/1990 | Rasor | ...................... | B60R 9/045 211/94.01 |
| 5,181,639 A * | 1/1993 | Kvanna | .................... | B60R 9/055 224/319 |
| 5,582,313 A * | 12/1996 | Envall | ..................... | B60R 9/055 220/4.22 |
| 7,175,377 B2 * | 2/2007 | Womack | ............... | B60P 7/0815 410/104 |
| 7,258,260 B2 * | 8/2007 | Hurd | ....................... | B60R 9/055 224/319 |
| 2003/0085247 A1 * | 5/2003 | Allen | ..................... | B60R 9/045 224/321 |
| 2004/0155081 A1 * | 8/2004 | Settelmayer | ............ | B60R 9/055 224/319 |
| 2005/0045678 A1 * | 3/2005 | Hurd | ....................... | B60R 9/055 224/319 |
| 2005/0051585 A1 * | 3/2005 | Kamiya | .................. | B60R 9/045 224/321 |
| 2006/0043130 A1 * | 3/2006 | Dabrowski | ............. | B60R 9/055 224/328 |
| 2011/0186608 A1 * | 8/2011 | Sautter | .................... | B60R 9/055 224/328 |
| 2013/0264366 A1 * | 10/2013 | Hubbard | ................. | B60R 9/058 224/328 |

* cited by examiner

*Primary Examiner* — Brian D Nash

(57) ABSTRACT

The invention provides a vehicle rooftop-mounted cargo container of rigid design that has the capability of sliding forward or rearward in the direction of travel of the vehicle on semi permanent mounting points while remaining attached to the vehicle, and that has the means to selectively keep the container from sliding forward or rearward upon the mounting points, and that also has the capability of being assembled as a container into various lengths using only a few interchangeable component parts.

20 Claims, 12 Drawing Sheets

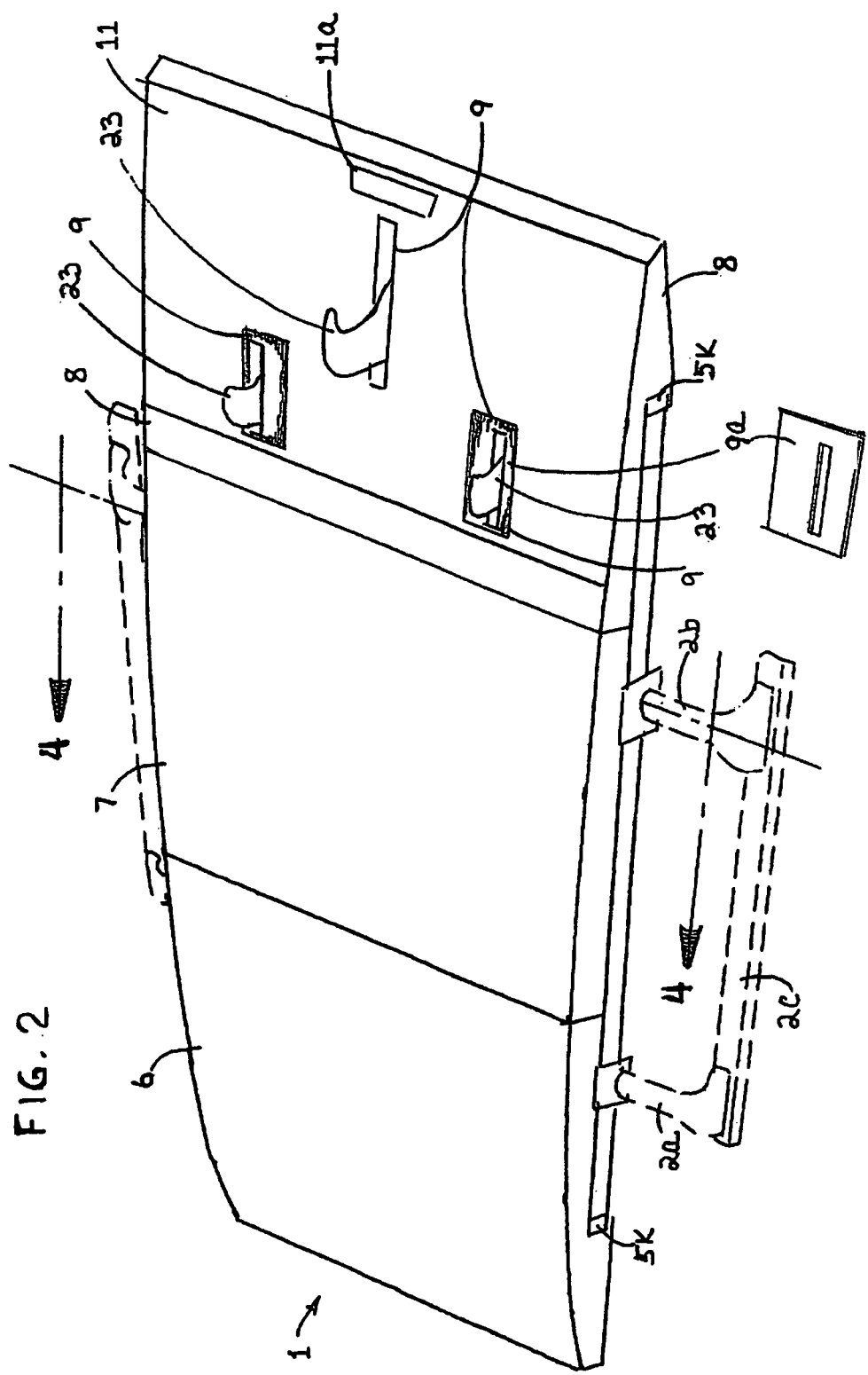

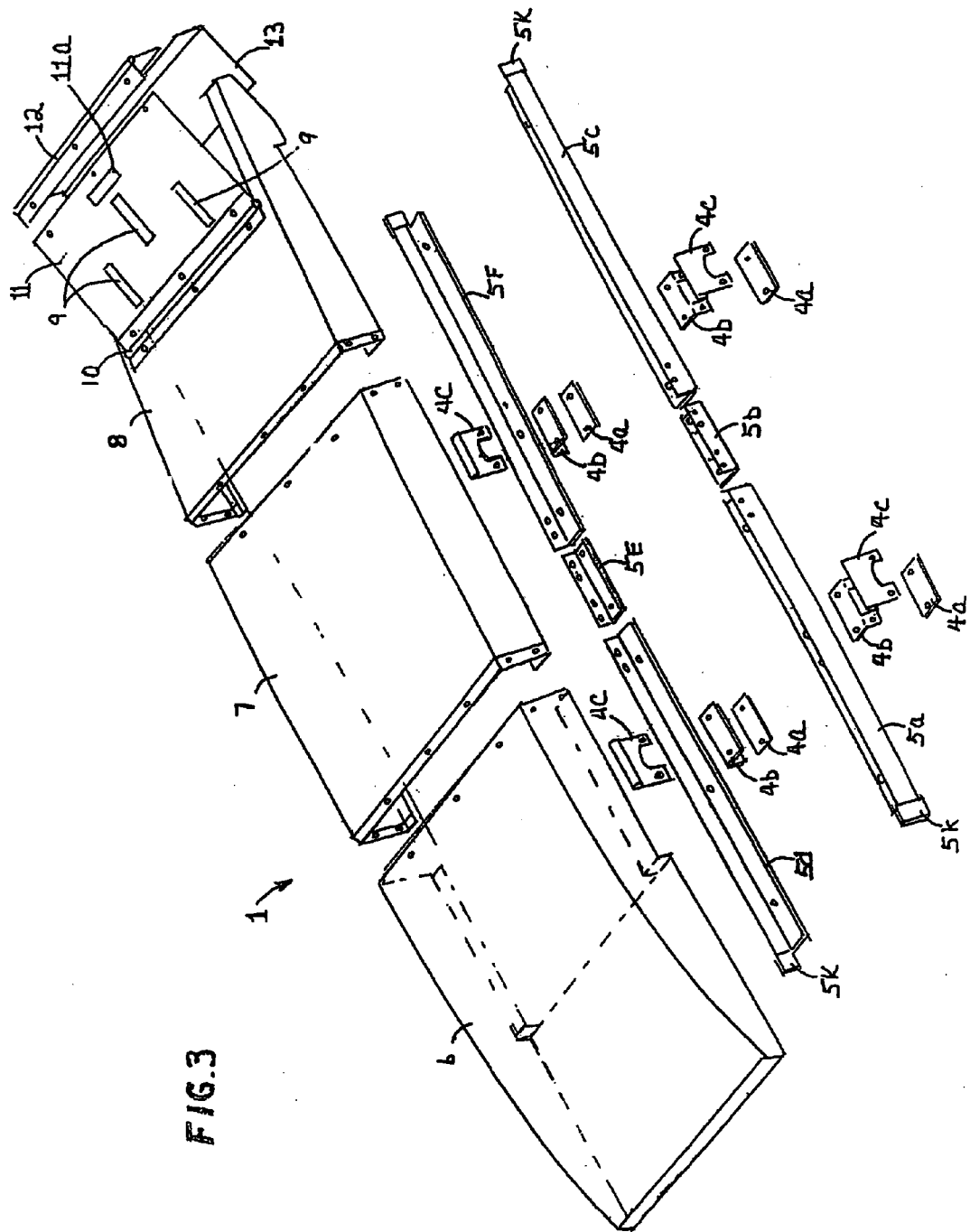

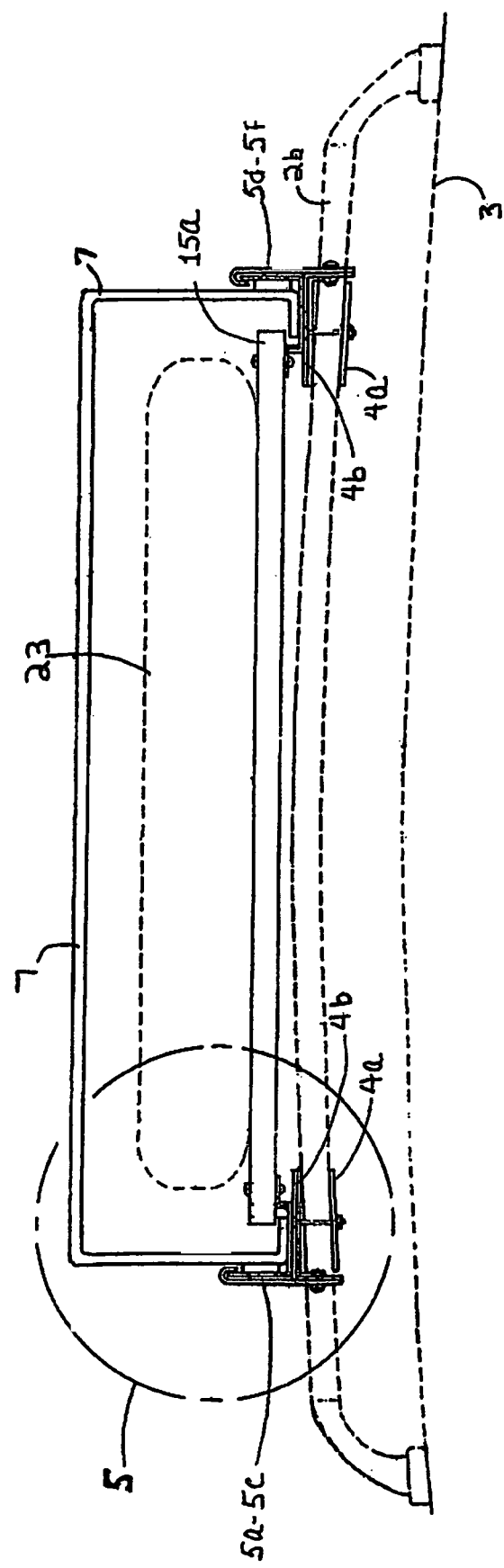

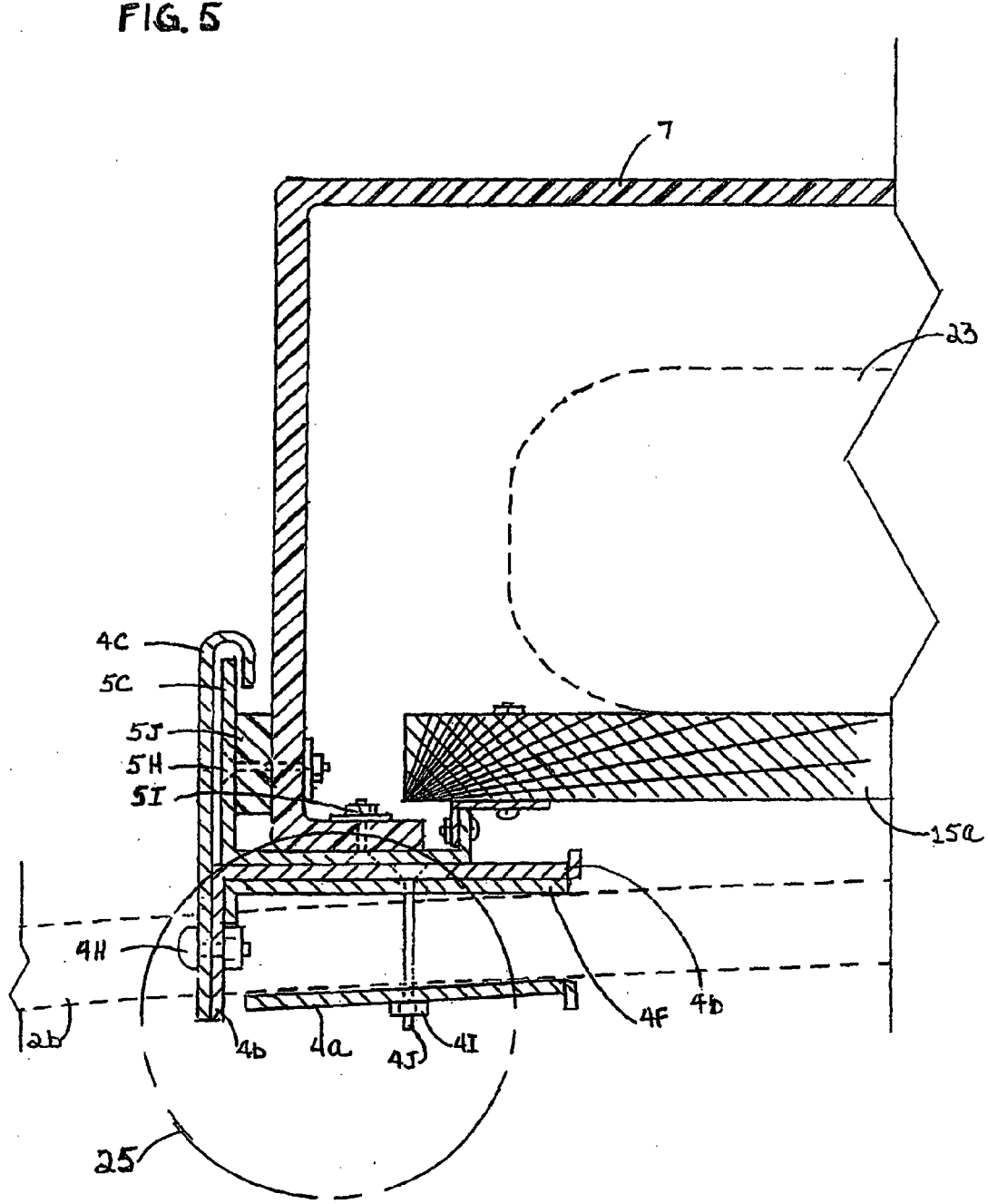

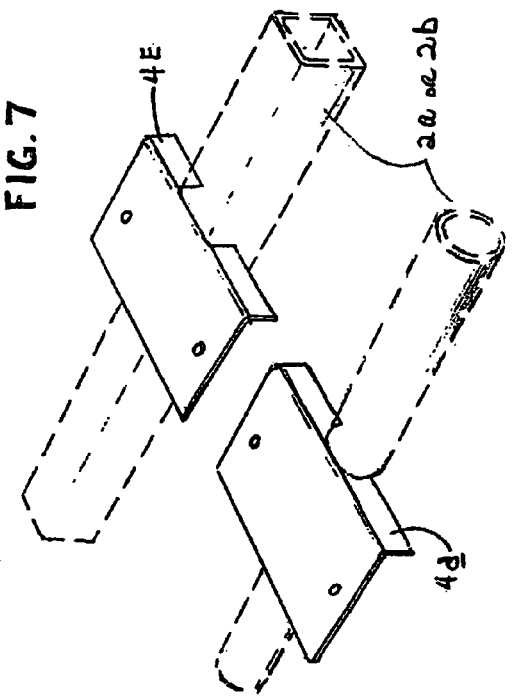
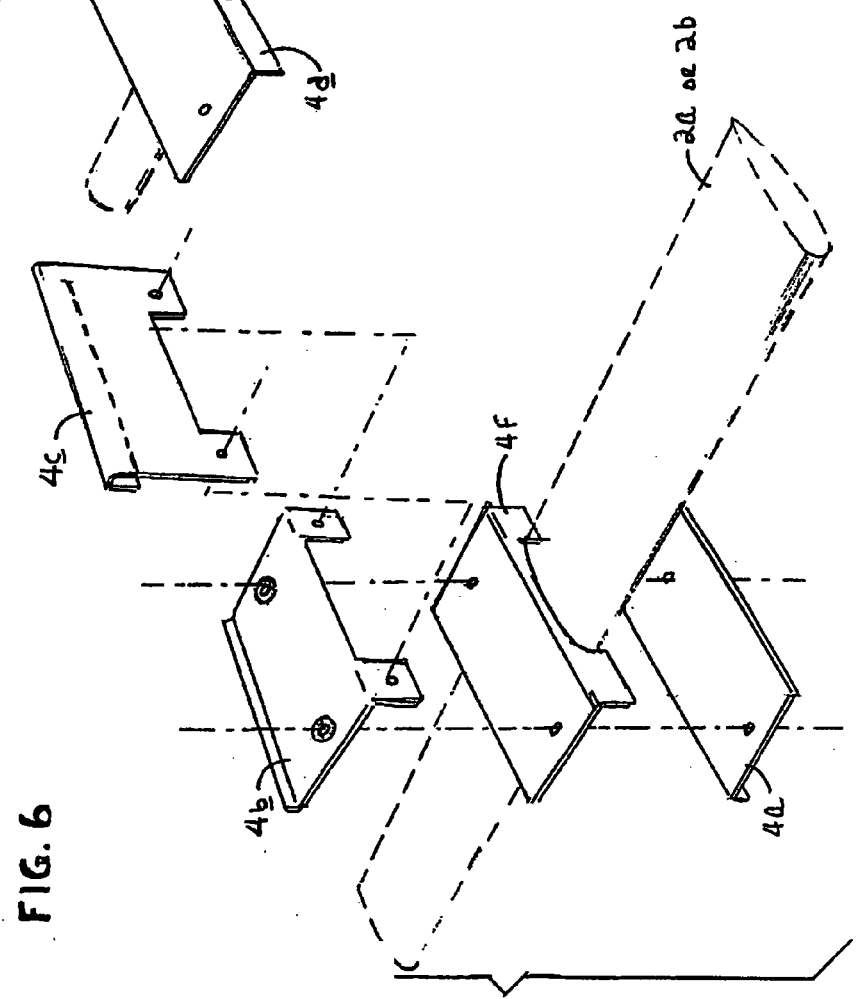

VEHICLE ROOFTOP CARGO HOLDER

BACKGROUND OF THE INVENTION

Field of the Invention

The invention relates to assemblies for carrying cargo on a vehicle. In particular, the invention provides an expandable container designed for mounting on top of a vehicle.

Description of the Related Art

The demand for devices to carry items of sports equipment on vehicle rooftops has grown and many devices exist to fill that need. However, there are several unique problems that have yet to be satisfied when securing and transporting a surfboard on a vehicle rooftop. The first problem is that surfboards range so much in size from about six to ten feet long, and that has been the main reason why until now there has been no single cargo container available to closely fit and securely enclose a surfboard on a vehicle roof. Consequently, the existing devices to carry a surfboard on a vehicle roof require the board to be lashed onto the top of the vehicle out in the open on various types of surface pads or racks. That method has been unsatisfactory because surfboards are especially vulnerable to damage from the heat and ultraviolet rays of the sun and to flexing damage from wind buffeting. Also, since surfboards are expensive and fragile, that means that when they must be left in the open on a vehicle rooftop, they are vulnerable to theft and vandalism. Surfing enthusiasts will benefit from the opportunity to buy one cargo carrying device that can be configured or reconfigured as needed to enclose a surfboard of any popular length inside of a rigid container on a vehicle rooftop where the board can also be stored indefinitely, and yet be safe from all of the aforementioned risks. Padded storage bags are available for surfboards that are tied onto vehicle roofs, but the bags become wet and moldy inside and dirty outside and are cumbersome to use which makes the bags a problem to handle and store and they only provide marginal protection. Surfers will also benefit from the present invention since it allows them to safely stand at the rear of their vehicle while inserting or removing their surfboards into or from this container, instead of having to climb up and reach over the vehicle rooftop to lash their surfboards onto its racks.

BRIEF SUMMARY OF THE INVENTION

An example of the invention provides a container that is easy to install on a vehicle rooftop rack, and that furthermore allows the container to then be moved forward or rearward while still attached to the vehicle in order to clear the hatchback doors found on many vehicles. A preferred design of the container includes an opening at the rear end of the container for accessing its interior area through which cargo may be inserted or removed, and a hatch door as an access barrier that covers that rear opening of the container. The preferred example of the invention also provides that the container is an expandable assembly of segmented modules that are designed to be coupled together to complete the container. Other examples and aspects of the invention are described in detail below.

BRIEF DESCRIPTION OF THE SEVERAL VIEWS OF THE DRAWINGS

FIG. 2 is a perspective top view of the surfboard container 1 shown mounted on a vehicle according to a first embodiment of the present invention.

FIG. 3 is an exploded isometric view of the embodiment of FIG. 1.

FIG. 4 is a sectional view taken along line 4-4 of FIG. 2.

FIG. 5 is an enlarged view taken from the area defined by line 5 of FIG. 4.

FIG. 6 is an exploded view of one of the mounting clamp assemblies shown in FIG. 3 that hold the container 1 down onto the crossbars of a vehicle rack as in FIG. 2. This FIG. 6 view also shows one of the crossbar adapters 4*f*, and "J" bracket 4*c*.

FIG. 7 is a view of two alternative crossbar adapters that allow the mounting clamp assemblies to be used with different styles of vehicle rack crossbars. The third alternative adapter 4*f* is shown in FIG. 6.

DETAILED DESCRIPTION OF THE PREFERRED EMBODIMENTS

Figure 1:
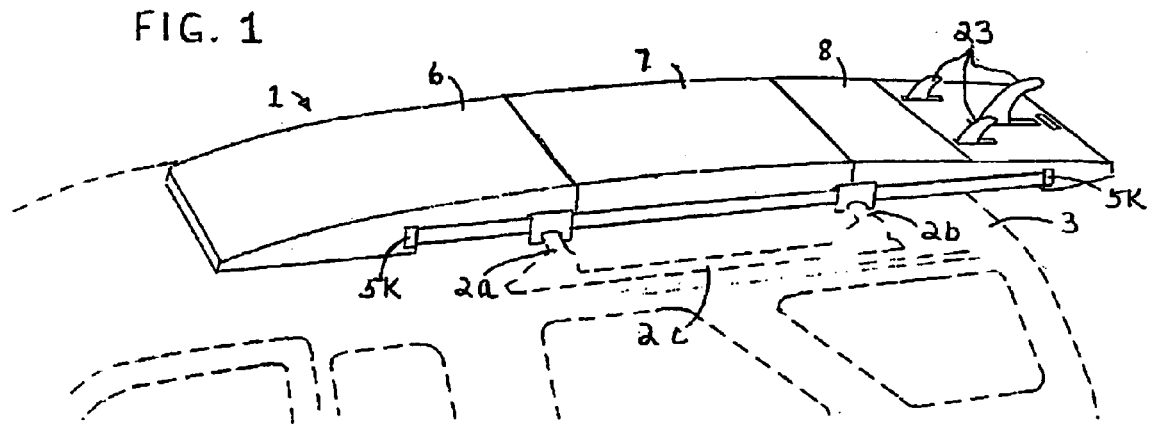
FIG. 1 is a perspective side view of the surfboard container 1 shown mounted on a vehicle rooftop rack according to a first embodiment of the present invention.
Figure 8:
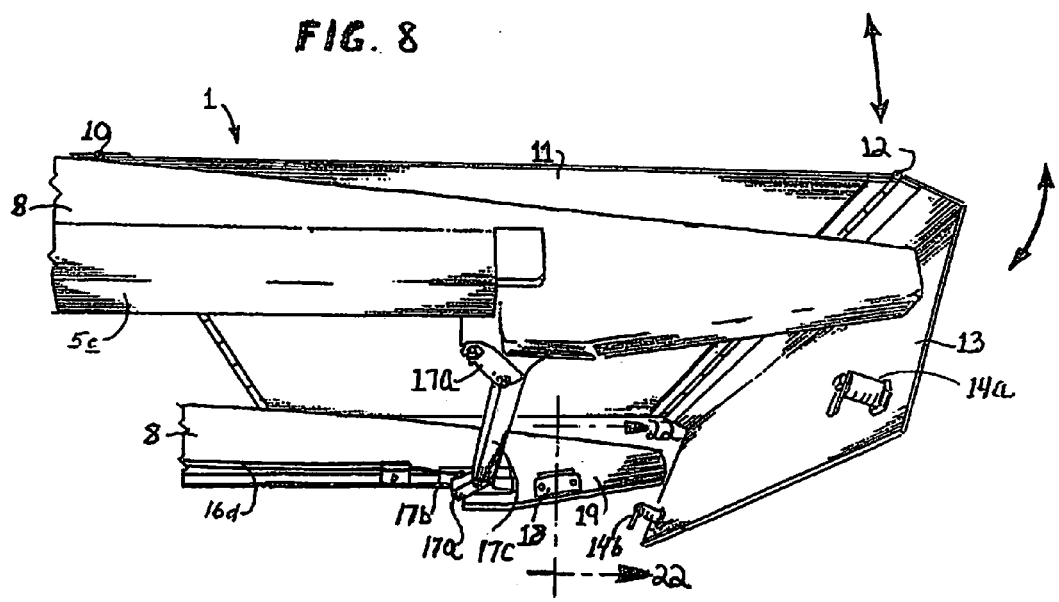
FIG. 8 is a perspective view of the tail end of the surfboard container 1 showing the hinged hatch door 10-13 as an access barrier, and cam latches 14*a*-14*b* and one of the two strike plates 18 for the cam latches.
Figure 9:
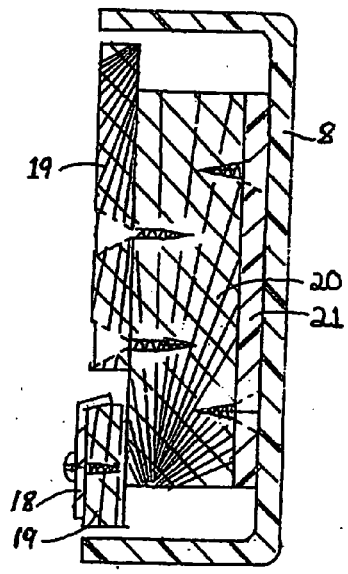
FIG. 9 is a sectional view taken along line 22-22 of FIG. 8 and shows one of the strike plates 18 and rigid inserts 19-21 as they would appear on the interior of each side of container 1.
Figure 15:
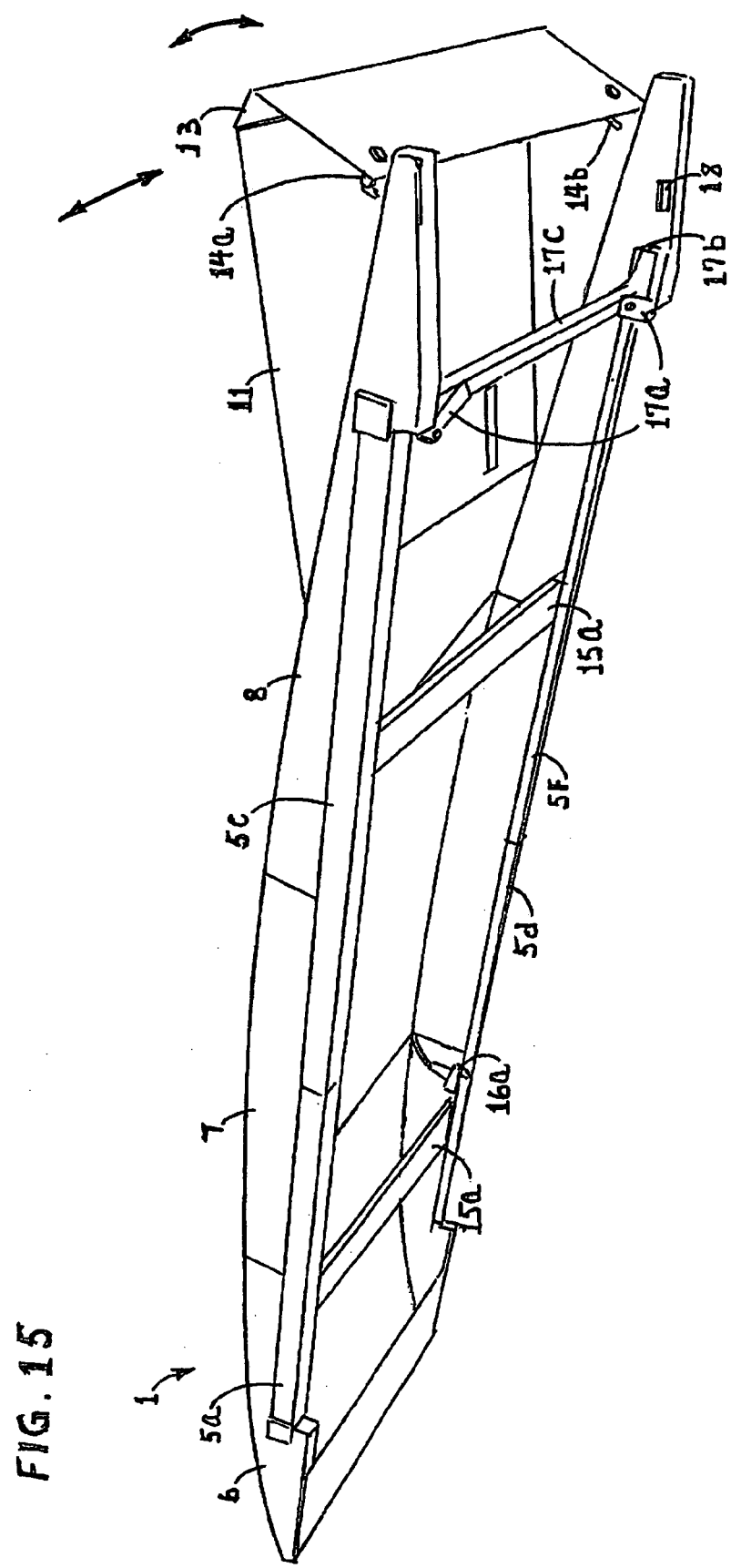
FIG. 15 is a perspective view of the underside of the surfboard container 1 showing the rear hatch door in the raised open position.

One embodiment of the present invention is shown generally in FIG. 1 and FIG. 2 where the container 1 is mounted to a pair of crossbars 2*a* and 2*b* that are, in turn, mounted to the cargo rack 2*c* of the roof 3 of a vehicle. As shown in FIG. 3, container 1 is comprised of a front module 6 and a middle module 7 and a rear module 8, where each module includes a portion of the top and side and bottom surfaces of the container, and where the front module 6 also includes the front surface of the container and the rear module 8 also includes a portion of the rear surface of the container, and the front and middle and rear modules are structurally compatible to be coupled end to end to one another in that order to generally complete the container. In the depicted embodiment of the present invention, container 1 includes a hinged rear lid assembly 10-13 as shown in FIG. 3 and FIG. 8. The rear lid assembly forms a hatch door that functions as an access barrier that can enclose the rear of container 1, and the hatch door includes cam latches as shown at 14a-14b in FIG. 8 and FIG. 15. The rear lid assembly has hinges in two locations 10 and 12 as in FIG. 3 and FIG. 8 that allow the hatch door to be opened upward and outward, or closed downward and inward over the ends of the rear modular section 8, and the hatch door is then held in place with cam latches such as shown at 14a-14b engaged into the slots and strike plates 18 as shown in FIG. 8 and FIG. 9 and FIG. 15 to enclose the end of container 1 and thus secure a surfboard or paddleboard inside of it. As shown in FIG. 1 and FIG. 2, when the surfboard or paddleboard is inside of the container 1, the fins of the board 23, extend through cutout openings in the top surface area of the container. As shown in FIG. 2, since the side fins found on most surfboards are spaced at varied distances from the centerlines of the boards, the two side fin cutouts at 9 in the top surface of the rear hatch door 11 of the container 1 for those two side fins are oversize, and adapter plates such as typically depicted at 9a, function as inserts to reduce the net size of the cutouts to minimize exposure of the surfboard to the elements. The adapter plates are positioned between the surfboard or paddleboard and the underside of the hatch door of the container. The adapter plates may be placed over each of the side fins before the board is inserted into the container 1, or the adapter plates may be mounted with adhesive or other suitable means on the underside of the hatch door in alignment with the oversize cutouts.

In FIG. 15, the underside of container 1 is depicted with the hatch door panels 11 and 13 in the raised open position in order to more clearly show three additional features. The first feature is that the bottom of container 1, only at its front end, is permanently enclosed by a portion of module 6. The second feature, is that the bottom of container 1, at its rearmost end, is enclosed only when the rear hatch door panels 11 and 13 are in the closed position, and the movement direction arrows in FIG. 8 at panels 11 and 13 show how those panels can be closed over the rear end of container 1 in a combination of two arcs. As a result, the bottom of container 1 at its rearmost end is being closed at the same time as the hinged panel 13 of the hatch door is being closed. The design provides that when the rear batch door is fully closed and latched with latches 14a and 14b engaged into their strike plates 18 as shown in FIG. 8 and FIG. 15, the bottom of container 1 is sufficiently enclosed at its front end and its rear end to prevent any surfboard that is inside of container 1 from being removed from the container. At the same time, the mostly open-air design of the bottom of container 1 saves weight and allows air to circulate around any surfboard that is stored in container 1. That air circulation from underneath container 1 reduces heat build-up inside of the container when the vehicle upon which it is mounted is parked in the sun. The third feature that is shown in FIG. 15, is that the bottom planar surfaces of the container 1 at its front and rear ends are stepped-down lower than the rest of the planar surfaces along the bottom of container 1. The step-down contour on the bottom of container 1 is to accommodate surfboards or paddleboards that have an arc from nose to tail that is known as "rocker" in the industry. The result of the presence of rocker means that when a surfboard or paddleboard is stored upside down in container 1, the nose-end and tail-end of the surfboard or paddleboard will be lower than the middle portions of the board, and the step-down feature on the bottom plane of container 1 at its forward and rearward ends allows for that, while also allowing the container to be mounted significantly lower on the vehicle roof as can be seen in FIG. 1. Other sizes and shapes and styles and locations of the members of the container and hatch door as depicted, and methods of accessing and then closing container 1, may alternatively be used without departing from the scope of the present invention. Although the container 1 as shown in FIG. 1 and FIG. 2 is depicted as an accessory that is mounted onto a separate pair of crossbars on a vehicle rooftop rack, the container such as 1 may also be mounted onto the roof of a vehicle via other means. Although the aforementioned members as depicted are the preferred embodiment of the present invention, they may have any desired shape and structure without departing from the scope of the present invention.

Figure 12:
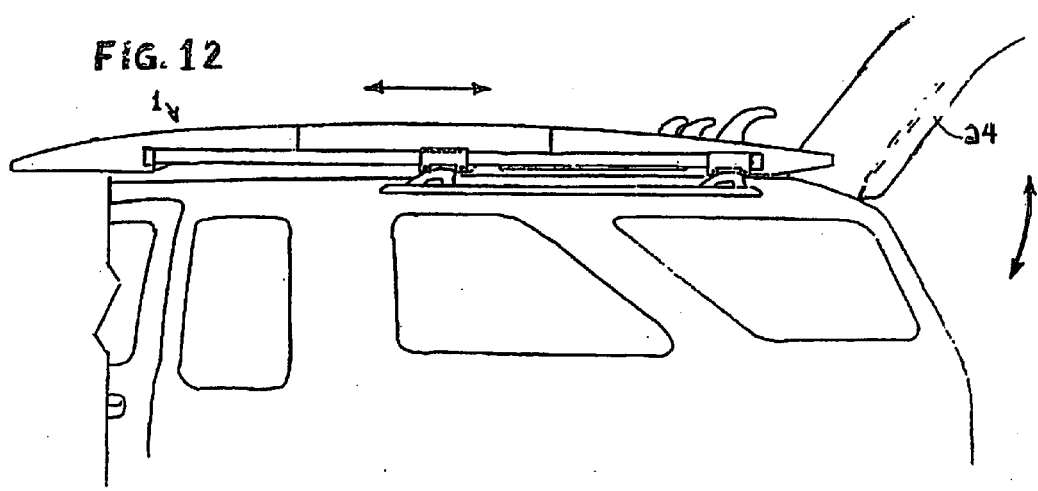
FIG. 12 is a side view of the container 1 shown mounted on a vehicle according to a first embodiment of the present invention, with the container in the forward position to allow the vehicle hatchback 24 to be fully raised.
Figure 14:
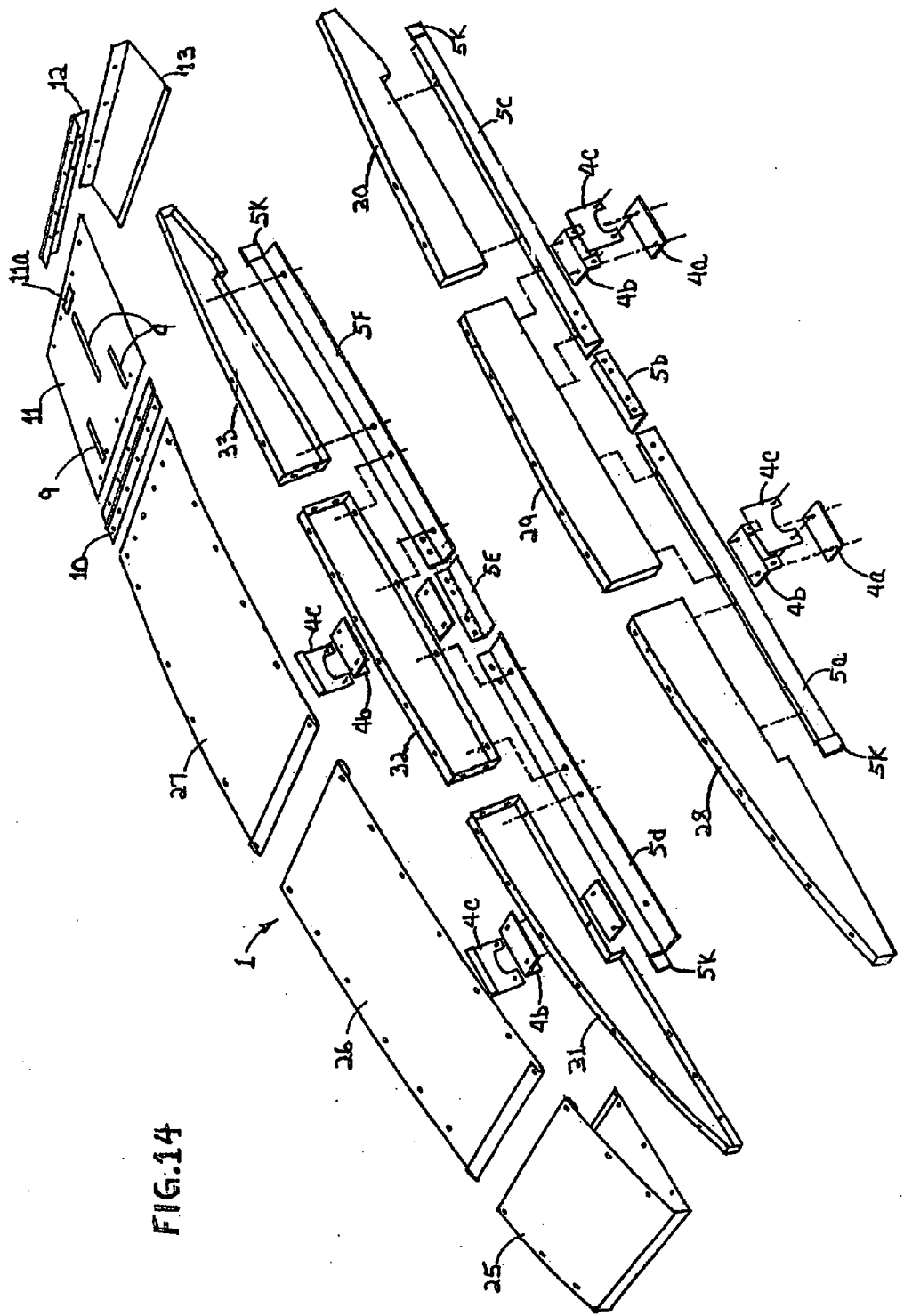
FIG. 14 is an exploded isometric view of an alternative embodiment of container 1.

The present invention also provides that the overall length of container 1 can be readily modified by the user during assembly of the container to accommodate and securely enclose a surfboard or paddleboard of any popular length. That modification feature is made possible since container 1 in its preferred embodiment as shown in FIG. 3 is an assembly of interchangeable modular sections that include a middle module at location 7. The middle module is designed to be manufactured and available in different lengths in twelve inch increments. The design of the container accordingly provides that by substituting a longer or shorter middle module section at location 7, the user can easily modify the assembled length of the container 1 to range for example from six feet long to ten feet long. Furthermore, since all such modular sections are components that are directly and structurally compatible at their junctions, the user may produce the shortest overall configuration of container 1 by simply coupling the front modular section 6 directly end to end with the rear modular section 8 without using the middle modular section 7. Any suitable connector or connectors may be used to couple the sections together. In addition to the modular components 6-8 that together comprise the top and bottom and side surfaces of container 1, FIG. 3 also shows a pair of horizontal guide rail assemblies. The first guide rail assembly is comprised of parts 5a and 5c that are coupled together with 5b, and the second guide rail assembly is comprised of 5d and 5f that are coupled together with 5e. As shown in FIG. 4 and FIG. 5, each of the two guide rails is mounted along the bottom edge of each side of container 1. The guide rails serve three purposes: they strengthen container 1 as an assembly, and they also provide a means to allow container 1 to slide upon specially designed vehicle rack crossbar mounting clamps, and the guide rails also serve as beams that reduce deflection along the length of the container when it is cantilevered beyond the vehicle rack crossbars as seen in FIG. 12. The horizontal guide rails and mounting clamps are described in greater detail in the next paragraphs. Although the depicted embodiment of the present invention in FIG. 3 has three complimentary modular sections and a hinged rear lid assembly forming a hatch door that functions as an access barrier at the rear of container 1, it may have either more or fewer sections as members or modules without departing from the scope of the present invention. For example, an alternative embodiment of the invention is shown at FIG. 14, wherein the container 1 is comprised of a first elongate side member assembly of sections 28 and 29 and 30, and a second elongate side member assembly of sections 31 and 32 and 33, that define the sides of container 1, and wherein the front end, and a portion of the lid and bottom surfaces of container 1, is formed by a nosepiece 25 which wraps around and is mounted to the front ends of each side member assembly, and the lid of container 1 consists of a plurality of complementary lid sections 26-27 that are linked together in sequence at their forward and rearward ends respectively to form the main portion of the lid of container 1. That allows the size of the container to similarly be easily modified by substituting or omitting only a limited number of interchangeable sections such as 29 and 32 and 26. All such variations of the present invention, including those depicted at FIGS. 3 and 14 therefore have in common the means to expand or reduce the length of the container with only a few interchangeable portions or sections. The structural components of container 1 may be made of any suitable material including but not limited to plastic or wood or sheet metal, or a combination of those without departing from the scope of the present invention.

Since container 1 is used for carrying elongated cargo such as a surfboard or paddleboard, the container will typically extend past the rear edge of the rooftop of many vehicles and would therefore otherwise interfere with a user's ability to fully raise the rear hatchback door found on many vehicles. Therefore the depicted embodiment of the present invention provides a solution. The invention allows the container 1 to be installed securely on a vehicle rooftop rack while also being able to slide forward or rearward on the vehicle rooftop rack by up to several feet in the direction of travel of the vehicle. That feature is provided by four specialized clamp assemblies that are attached to the vehicle rack crossbars, and by inverted "J" brackets that are attached to the clamp assemblies, and by the way that the "J" brackets extend over and slide upon the top edges of horizontal guide rails that are attached to container 1. More specifically, the clamp assemblies and the "J" brackets are shown in FIG. 3 and FIG. 6 as 4a-4c. The four clamp assemblies are located on the forward and rearward vehicle rack crossbars 2a and 2b as shown in FIG. 2. FIG. 4 shows where the clamp assemblies are positioned on each crossbar. As shown in FIG. 5 and FIG. 6, the typical clamp assembly consists of plates 4a and 4b, and an adapter plate such as 4f, that are all held in compression on the vehicle rack crossbar such as 2b by machine screws 4j and nuts 4i as shown in FIG. 5. The clamp assemblies then can serve as semi-permanent mounting points that can hold container 1 onto the crossbars using inverted "J" brackets 4c that are attached to the clamp assemblies by tamper proof screws 4h. As shown in FIG. 5, the "J" brackets 4c then extend over the top edges of the guide rails 5c in order to slideably link the horizontal guide rails mounted on container 1 to the clamp assemblies mounted on the vehicle crossbars. As also shown in FIG. 5, the horizontal guide rails are attached to the bottom outside edges of container 1 with machine screws 5h and nuts 5i, while spacers 5j between the sides of container 1 and the horizontal guide rails maintain clearance for the "J" brackets to slide easily along the full length of the horizontal guide rails. FIG. 5 also shows that the flat top surface of part 4b of the clamp assemblies interfaces with the flat bottom surfaces of the horizontal guide rails such as shown as 5c to work together as complimentary low-friction bearing surfaces that allow container 1 to freely slide over the clamp assemblies. The "J" brackets that link the clamp assemblies to the guide rails only allow that sliding motion to be forward or rearward in the direction of travel of the vehicle, while also preventing container 1 from lifting away from the clamp assemblies and off of the vehicle and preventing the container from sliding side to side and off of its position over the clamp assemblies.

Since the top surfaces of each of the four clamp assemblies is relatively flat and unobtrusive, the clamp assemblies can be installed semi-permanently on the vehicle rack crossbars 2a and 2b and remain there without interfering with other uses of the vehicle racks when the container 1 is removed from the vehicle. The clamp assemblies may be clamped onto the vehicle rack crossbars 2a and 2b using screws and nuts or any other suitable means such as shown in FIGS. 4 and 5. The clamp assemblies, which consist of parts 4a and 4b shown in FIG. 6, are installed on the vehicle rack crossbars with one of the three types of adapters 4d-4f shown in FIG. 6 and FIG. 7. As shown in FIG. 6, part 4a is installed on the underside of the vehicle rack crossbar, and 4b is installed on the top surface of the crossbar, and one of the adapters is installed under part 4b and just above the top surface of the vehicle rack crossbar. Parts 4a and 4b, and any one of the adapters used will all have screw holes that are aligned vertically as shown in FIG. 6 to allow one or more flathead machine screws to be inserted through them in locations that are on either side of each crossbar of the vehicle rack. The machine screws 4j on each clamp assembly both extend downward from the top surface of 4b and through an adapter such as 4d or 4e or 4f and then also through 4a, with a nut 4i on the end of the machine screw 4j as shown in FIG. 5 that when tightened causes the clamp assembly to clamp tightly onto the vehicle rack crossbar. As shown in FIG. 5 and FIG. 6, parts 4a and 4b each have an approximately 90 degree bend lengthwise along one edge to prevent excessive deflection when those plates are tightened into clamping position on the vehicle rack crossbars. Depressions in the top surface of 4b as depicted in FIG. 6 allow the top of each flathead screw 4j to countersink into the top surface of 4b as shown in FIG. 5 so that the screw head is flush with the top surface of 4b in order to provide a flat overall surface so that the horizontal guide rails of container 1 will be able to easily slide on each of the four clamp assemblies. Each type of adapter 4d-4f is made with a different shape notch, such as round or square or flat, as shown in FIGS. 6 and 7 to match the cross section shapes and dimensions of all the various popular vehicle rack crossbars. The unique design of the specialized adapters, such as 4f as shown in the area defined by line 25 in FIG. 5, allows them to be made with various angles that can compensate for the presence or absence of any side to side arc found on the crossbars of many vehicle racks such as shown in FIG. 4, so that the top surfaces of the mounting clamp assemblies are approximately uniformly level front to back and side to side when installed on the crossbars. Alternative sizes and shapes of the structural components, and alternative connection points or assembly sequences of some or all of the components, may be used without departing from the scope of the present invention. As an example of such an alternative, the horizontal guide rails, such as 5a-5f, could instead be slideably connected more permanently to the clamp assemblies, such as 4a-4b, to form a sub-assembly consisting a guide rail that slideably clamps onto each vehicle rack crossbar, or that clamps onto both forward and rearward crossbars as a unit. That alternative design would not use the "J" brackets such as 4c. Instead, after the user has attached one or a pair of those clamping guiderail sub-assemblies onto the vehicle rack crossbars, then as a subsequent step the container assembly of modules, such as 6-8, could be mounted onto or later removed from the clamping guide rail sub-assemblies, so that when the container modules are removed from the vehicle rooftop, the sub-assemblies consisting of the crossbar clamps and guide rails would remain attached, as units, to the vehicle rack crossbars.

In the depicted embodiment of the present invention, and as shown in FIG. 4, the clamp assemblies are installed on the vehicle rack crossbars at locations that allow the clamp assemblies 4a-4b to be aligned directly underneath the horizontal guide rails 5a-5f that are attached to container 1. The clamp assemblies are therefore placed on each crossbar at a distance approximately equal to the outside width of the horizontal guide rails 5a-5f as shown in FIG. 4. As shown in FIG. 3, each horizontal guide rail is an assembly that is coupled together by lap joints at couplers such as 5b and 5e. The lap joints at the couplers 5b and 5e are held together with flathead machine screws 5h as shown in FIG. 5 that are countersunk into the horizontal guide rail outboard surfaces to provide a way for the "J" brackets 4c as shown in FIG. 5 and FIG. 6 to move freely along the entire length of each assembled horizontal guide rail. Each of the horizontal guide rail assemblies 5a-5c and 5d-5f is attached to each side of container 1 in a manner as shown typically in FIG. 5. The horizontal guide rails are attached to the assembled container modules 6-8 as in FIG. 3, or as an alternative to the side member assemblies 28-33 as in FIG. 14, at a plurality of locations such as also shown in FIG. 14. At the ends of each horizontal guide rail assembly, dress caps 5k as shown in FIG. 1 and FIG. 2 and FIG. 3 provide end stops and a finished appearance. When the container 1 is moved forward or rearward on the vehicle rack crossbars 2a and 2b, the surfboard or paddleboard 23 stored inside the container as shown in FIGS. 4 and 5 does not interfere with the vehicle rack crossbars since the surfboard is supported inside the container just above the vehicle rack crossbars in two locations fore and aft by two surfboard support bars 15a attached to the inside the container as also shown in FIG. 4 and FIG. 5 and FIG. 15. The surfboard support bars allow the surfboard to move forward or rearward with the container at all times while stored in it.

Figure 13:
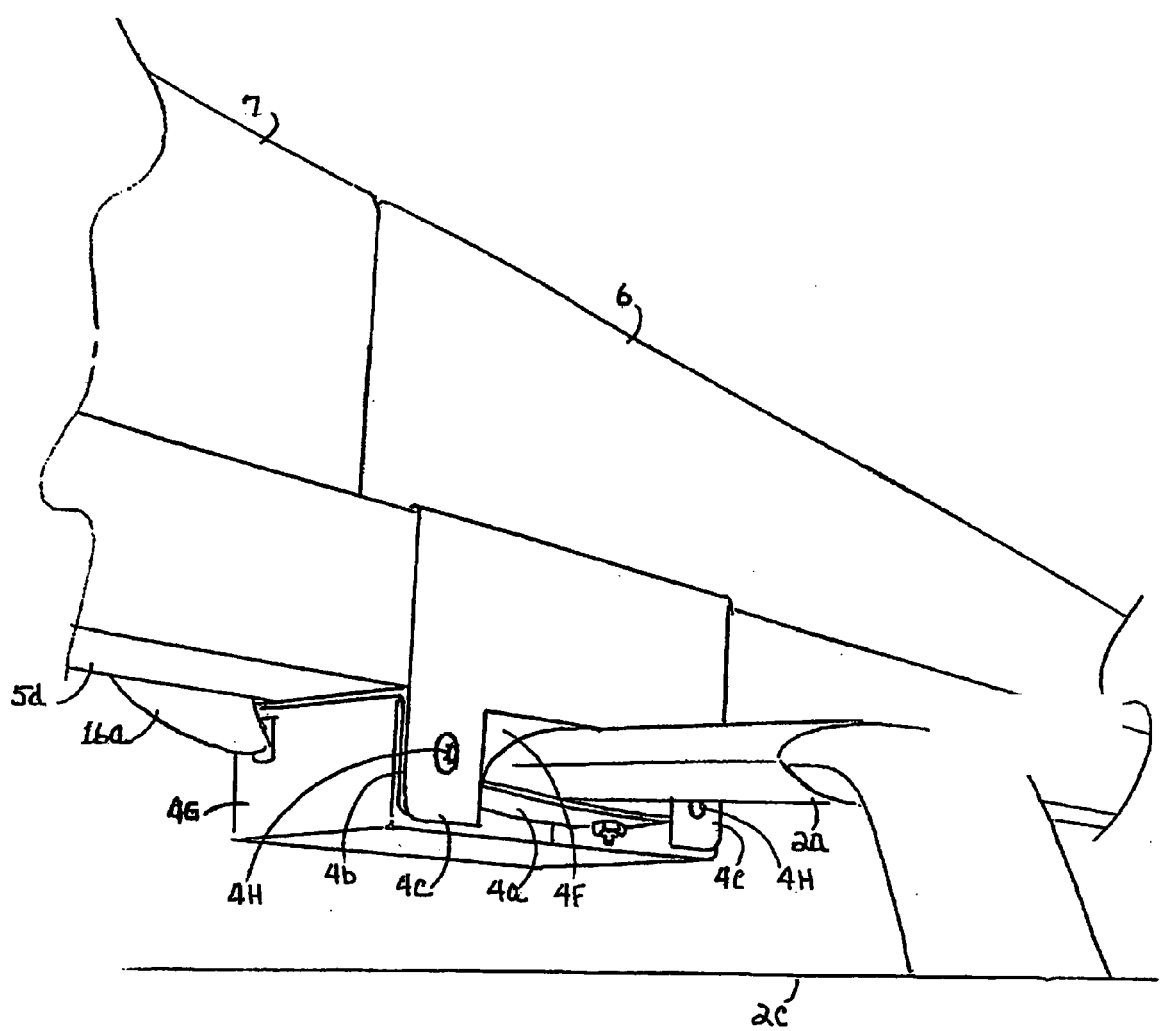
FIG. 13 is a perspective view of one of the fully assembled mounting clamps on the crossbar of a vehicle rooftop rack. The view also shows a wraparound cover 4*g* on the assembled mounting clamp and shows a latch 16*a* engaged onto the mounting clamp assembly.

As shown in FIG. 5 and FIG. 13, each "J" bracket 4c is attached to each clamp assembly by two tamperproof screws 4h that screw into weld nuts 4k that are permanently attached to the inboard surfaces of the two downward facing tabs of part 4b as backup for those screws, or by other suitable means. The design then provides that once the four clamp assemblies are mounted in place on the vehicle rack crossbars, container 1 may be easily placed upon the clamp assemblies and then slidably attached to them using the four inverted "J" brackets 4c with screws 4h, or later removed from the clamp assemblies by the reverse procedure with relative ease. As shown in FIG. 5, when container 1 is mounted onto the vehicle rack in this way, it is secure from theft since the heads of screws 4j that hold the clamp assemblies to the vehicle rack crossbars are not accessible when the container 1 is in position on top of the clamp assemblies. As shown in FIG. 13 each clamp assembly has a wraparound cover 4g that enhances its appearance by concealing the clamp screws 4j and nuts 4i as well as the gap between the top and bottom clamping plates 4a and 4b. All of the depicted and aforementioned members may have various additional shapes and be made of various materials without departing from the scope of the present invention.

Figure 10:
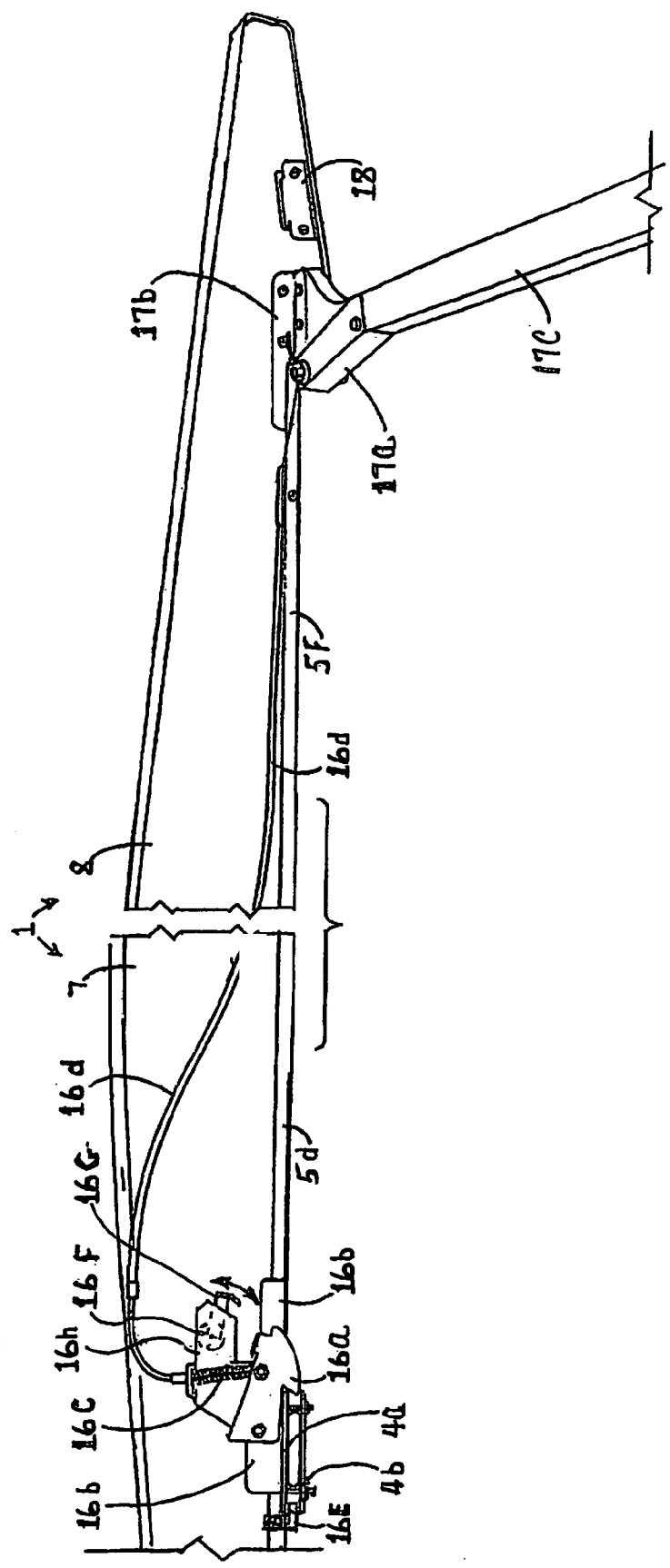
FIG. 10 is an interior view of one of the sides of the surfboard container 1 showing the spring loaded latch 16*a* and cable 16*d* and latch retracting lever 17*a* and its support 17*c* mounted in the container as in FIG. 8.
Figure 11:
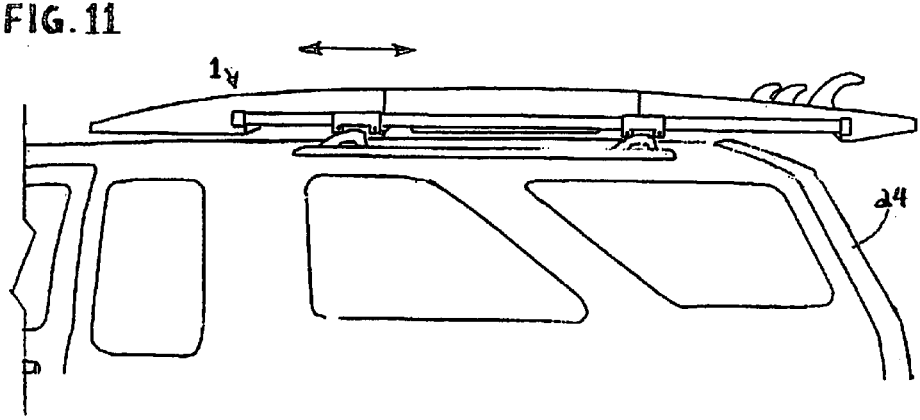
FIG. 11 is a side view of the container 1 shown mounted on a vehicle according to a first embodiment of the present invention, with the container latched into the rearward position and ready for vehicle transport.

The depicted embodiment of the present invention furthermore provides a means to restrain container 1 in a rearward position to keep it from sliding forward during vehicle transport as shown in FIG. 11, or conversely to allow the user to release the container 1 and move it forward on the vehicle by up to several feet when necessary to clear the raised hatchback door of the vehicle as shown in FIG. 12. To selectively restrain the container 1 in that manner, the invention provides two latching mechanisms with each mounted on each elongated side of container 1. The latching mechanisms on each side of container 1 are mirror images of one another. Each latching mechanism is mounted at the bottom inside edge of each side of container 1 as shown in FIG. 10. Each latching mechanism includes parts 16a-16d and 17a-17c. The mechanisms include spring loaded latch plates 16a that pivot on brackets 16b that are mounted to the inside edge of each horizontal guide rail such as 5d of container 1. The latch plates 16a are designed to engage the mounting clamp assemblies 4a-4b to keep the container 1 from sliding forward. However, the latch plates can be manually retracted by depressing the levers 17a such as shown in FIG. 10 and FIG. 15 that are located at the rear of the container, allowing the container to then be pushed forward by the user in the direction of travel of the vehicle. That operation may be easily and readily accomplished when the user stands at the rear of the vehicle and manually depresses both of the levers 17a that are mounted to the lever support bar 17c that is attached by brackets 17b to the interior surfaces near the end of container 1. Once the 17a levers are both depressed, the user can then push the support bar 17c to move container 1 forward on the vehicle and thus slide it out of the way in order to then raise the hatchback door 24 of the vehicle as shown in FIG. 12. Then to pull container 1 rearward to its original position where it belongs during vehicle transport with the hatchback of the vehicle closed as in FIG. 11, the user can grasp the container at the rear handle 11a shown in FIG. 2 and FIG. 3 and pull the container 1 rearward until the container reaches the stops 16e as shown in FIG. 10. During that return motion, the latch plates 16a automatically rise up and over the mounting bracket plate 4a due to the bevel curved leading edges on each of the latch plates as shown in FIG. 10. However, when the rearward pulling motion reaches the stops 16e, the springs 16c force the latch plates 16a to return to their original engaged positions downward onto the clamp assemblies 4a-4b on the vehicle rack crossbars. Each of the stops 16e also has a rearward facing prong that projects underneath part 4a to serve as a safety measure to hold container 1 down onto the vehicle. The invention therefore provides the means to capture or release container 1.

As a result, each latching mechanism on each side of container 1 consists of a latch plate 16a that pivots upon its mounting bracket 16b which is attached to the horizontal guide rails 5a-5f, and a return spring 16c keeps the latch plate normally engaged downward upon the clamp assembly 4a-4b. In the preferred embodiment of the present invention however, the latch plate may be retracted by a jacketed-wire mechanical control cable as shown in FIG. 10 as 16d. One end of that control cable is attached to the pivoting latch plate 16a and the other end of the cable is attached to the finger lever 17a. The control cable 16d is pulled into tension against the compression return spring 16c when the user manually depresses the levers 17a located on the support bar 17c as shown in FIG. 10 and FIG. 15. The invention also provides an additional safety measure shown in FIG. 10 to hold the latch plate 16a in its downward engaged position upon the clamp assembly. That safety measure is a cam latch 16f that is mounted through the exterior side wall of the container 1. The cam latch mechanism in FIG. 10 is shown behind a protective plate 16h that prevents tampering. The safety mechanism allows the user to turn the cam latch arm 16g clockwise and downward ninety degrees until the bottom end of the arm rests in contact with the top surface of the latch plate 16a. The cam latch arm 16g is "L" shaped as viewed from its side so that its bottom end which forms the short leg of the "L" extends outward past the protective plate 16h to be able to engage the top of the latch plate 16a. Actuating the cam latch arm in that manner can be accomplished by the user from the exterior of container 1 by manually turning a knob or other suitable handle that is attached through the side wall of the container 1 to the cam latch arm. While the cam latch arm is in that downward position, the latch plate 16a cannot be raised and retracted either manually or via the mechanical control cable 16d, or by the levers 17a, and the result is that the container 1 cannot be moved forward or rearward or removed from the top of the vehicle even if all the "J" brackets 4c have been removed from the clamp assemblies 4a-4b.

More specifically with regard to the design and operation of the finger levers 17a as shown in FIG. 10, they are attached to and pivot upon either end of the support bar 17c. The support bar is mounted to the inside surfaces at the ends of container 1 with brackets 17b as shown in FIG. 8 and FIG. 10. The 17b brackets are mounted to inserts 19-21 shown in the section view of FIG. 9 which is taken along line 22-22 of FIG. 8. As shown in FIG. 9, the inserts 19-21 consist of a plastic layer 21 that is attached to the inside surfaces at the ends of module 8 with adhesive after being attached to a wood spacer block 20 by screws, and then a plywood layer 19 is screwed to the wood spacer block to form an insert assembly that is flush with the inside edges of module 8. However, the inserts may be molded into and made a part of module 8, or may be made of any other suitable materials that serve to strengthen and support the cantilevered tail ends of container 1, and the inserts may be attached to container 1 by any other suitable means. As also shown in FIG. 8 and FIG. 9, the inserts also provide mounting points for each strike plate 18 that forms the lower edge of the slot that receives the cam levers 14a and 14b that hold the hatch door 10-13 in its closed position on container 1.

Although the depicted embodiment of the present invention is shown as a surfboard or paddleboard carrying container that allows the user to unlatch the container and then slide it forward by up to several feet and then later slide the container back into its initial latched position, during which time the container remains secured to the vehicle rack, the sliding and latching features of the design may be adapted to use the design to carry any cargo carrying device such as utility rack or basket or cradle that may be substituted for or work in conjunction with container 1 without departing from the scope of the present invention. The latches described and depicted here could alternatively be actuated by any suitable means including but not limited to solenoid or hydraulic motion transmission without departing from the scope of the present invention. Also, any other suitable means of selectively and readily holding and then releasing the position of the container from sliding forward or rearward on the vehicle while it is still secured to the vehicle rack, such as with bolts or other suitable arresting mechanisms, may also be used in place of the latches as depicted and described without departing from the scope of the present invention. Alternative sizes and shapes and locations of the structural components depicted and described above may also be used without departing from the scope of the present invention.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

While the present invention has been particularly shown and described with reference to the foregoing preferred embodiments, those skilled in the art will understand that many variations may be made therein without departing from the spirit and scope of the invention as variously described and defined above. The description of the invention should be understood to include all novel and non-obvious combinations of elements described herein.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a new invention or directed to the same invention, whether different, broader, narrower or equal in scope to the original claims, are also regarded as included within the subject matter of the inventions of the present disclosure.

What is claimed is:

1. A vehicle rooftop mounted cargo carrier for at least one surfboard, the carrier comprising:
   a. a cargo container having opposing lateral sides approximately parallel to its long axis and to the direction of travel of the vehicle, and a top, a bottom, a front end, and a rear end, all having inner surfaces and outer surfaces;
   b. said cargo container comprising a lengthwise assembly of at least two modular sections that are structurally compatible to be coupled together to form the overall assembled size of said container;
   c. the overall assembled size of the container may be modified by the substitution, during its assembly, of at least one of the said structurally compatible modular sections for another compatible modular section of different size as part of the overall assembly;
   d. an access opening at the rearward end of said cargo container through which opening at least one surfboard can be inserted into the container;
   e. said access opening having at least one clear space that can accommodate one or more surfboard fins that might project from the underside of said surfboard inserted into the container;
   f. at least one access barrier that can be positioned over said access opening to restrict the removal of at least one surfboard from the container;
   g. said access barrier hingedly attached to the cargo container proximate to said access opening in a manner that allows the access barrier to arcuately swing over the access opening.

2. The container of claim 1, wherein one or more bottom planar surfaces at the forward end of the container, as viewed from either of its lateral sides, are stepped-down at least one-half inch lower than the rest of the bottom planar surfaces of the container for at least the first two inches from said front end of the container.

3. The container of claim 1, wherein the bottom of the container is partially unenclosed, and the relative size of said unenclosed area is calculated as being at least one-half of one percent of the combined exterior surface areas of the top-half of the container.

4. The container of claim 1, wherein said access barrier comprises at least two panels that are hingedly attached together, and at least one of the panels is also hingedly attached to the container proximate to said access opening.

5. The container of claim 1, wherein said modular sections comprise a front end modular section, and at least one interchangeable middle modular section that can be substituted for another middle modular section of different size, and a rear end modular section.

6. The container of claim 1, wherein each of its lateral sides is comprised of a forward modular side section and at least one interchangeable middle modular side section and a rearward modular side section, and the top of the container is comprised of at least one interchangeable modular lid section, and the front end of the container is comprised of a modular nose cover, and the rear end of the container is comprised of a modular access barrier.

7. The container of claim 1, wherein there is at least one surfboard fin-opening through which the fins of a surfboard can extend to the exterior of the container when a surfboard is placed in the container and the access barrier is positioned over the access opening.

8. The container of claim 7, wherein at least one surfboard fin-opening adapter panel is used in combination with said fin-opening, in order to reduce the net overall size of the fin-opening and to accommodate the location and configuration of any fins that might be on the surfboard that is in the container.

9. A vehicle rooftop mounted cargo carrier for at least one surfboard, the carrier comprising:
   a. a cargo container having opposing lateral sides approximately parallel to its long axis and to the direction of travel of the vehicle, and a top, a bottom, a front end, and a rear end, all having inner surfaces and outer surfaces;
   b. an access opening at the rearward end of said container through which opening at least one surfboard can be inserted into the container;
   c. said access opening having at least one clear space that can accommodate one or more surfboard fins that might project from the underside of said surfboard inserted into the container;
   d. at least one access barrier that can be positioned over said access opening to restrict the removal of at least one surfboard from the container;
   e. said access barrier may be secured in the closed position over said access opening by at least one suitable means;
   f. at least one surfboard fin-opening through which the fins of a surfboard can extend to the exterior of the container when a surfboard is placed in the container and the access barrier is positioned over the access opening;
   g. at least one surfboard fin-opening adapter panel is used in combination with said fin-opening, in order to reduce the net overall size of the fin-opening and to accommodate the location and configuration of one or more fins that might be on the surfboard that is in the container.

10. A cargo carrying device for mounting on a motor vehicle rooftop cargo rack, the device comprising:
   a. a supportive receiver for cargo;
   b. said receiver having lateral sides, a top, a bottom, a front end, and a rear end;
   c. at least one mounting bracket that is fixed by suitable means on the crossbars for the vehicle rooftop cargo rack;
   d. the at least one mounting bracket angled by adaptive means to accommodate the angle present on said crossbars in relation to a horizontal line drawn between the crossbar anchor points on the right side and left side of the vehicle;
   e. at least one rail attached to said cargo receiver;
   f. the at least one rail may be slidably attached to said mounting bracket, and angled by suitable means to adapt to the angle of said mounting bracket;
   g. at least one latching mechanism to prevent said rail from moving forward or rearward in the direction of travel of the vehicle relative to said mounting bracket;
   h. at least one release mechanism that is actuated from at least one position proximate to the cargo carrying device to selectively release said latching mechanism in order to allow said rail to be moved relative to said mounting bracket;
   i. the at least one release mechanism is actuated remotely by use of suitable motion transfer means.

11. The device of claim 10, wherein said mounting bracket may be fixed on the crossbars for a vehicle rooftop cargo rack by clamping means, and said mounting bracket comprises at least one integrated insert to adapt to any variation of vehicle rack crossbar shape, size, and angle.

12. The device of claim 10, wherein the at least one rail includes portions that are channel-shaped as viewed from their cross-sections.

13. The device of claim 10, wherein the at least one rail is comprised of rail sections that are slidably attached together to provide extension slide capability.

14. The device of claim 10, wherein at least one "J" bracket is employed to slidably attach the at least one rail to the at least one mounting bracket.

15. The device of claim 10, wherein the at least one latching mechanism includes a means that allows the latching mechanism to appropriately bypass any obstructions within said device that it may encounter when the cargo receiver position is moved in any one direction relative to the at least one mounting bracket.

16. The device of claim 10, wherein said supportive receiver for cargo comprises a cargo container having opposing lateral sides approximately parallel to the direction of travel of the vehicle, and a top, a front end, a bottom, and a rear end, all having inner surfaces and outer surfaces.

17. The cargo container of claim 16, wherein said cargo container comprises an access opening through which cargo may be placed into the container, and at least one access barrier that can be positioned over the access opening to restrict the removal of cargo from the container.

18. The cargo container of claim 16, wherein said cargo container comprises a lengthwise assembly of at least two modular sections, and said modular sections are structurally compatible to be coupled together to form the overall assembled size of the container, and the overall assembled size of the container may be modified by the substitution, during its assembly, of at least one of the modular sections for another modular section of different size.

19. The cargo container of claim 18, wherein said modular sections comprise a front end modular section, and at least one interchangeable middle modular section that can be substituted for another middle modular section of different size, and a rear end modular section.

20. The cargo container of claim 18, wherein each of its lateral sides is comprised of a forward modular side section and at least one interchangeable middle modular side section and a rearward modular side section, and the top of the container is comprised of at least one interchangeable modular lid section, and the front end of the container is comprised of a modular nose cover, and the rear end of the container is comprised of a modular rear end section.

* * * * *